(12) United States Patent
Sun

(10) Patent No.: US 10,186,145 B1
(45) Date of Patent: Jan. 22, 2019

(54) REMOTE CONTROL DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Lei Sun, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/846,226

(22) Filed: Dec. 19, 2017

(30) Foreign Application Priority Data

Sep. 20, 2017 (CN) .......................... 2017 1 0851033

(51) Int. Cl.
*G08C 17/02* (2006.01)
*G06F 3/044* (2006.01)

(52) U.S. Cl.
CPC ............. *G08C 17/02* (2013.01); *G06F 3/044* (2013.01); *G08C 2201/11* (2013.01); *G08C 2201/30* (2013.01)

(58) Field of Classification Search
CPC .......... G06F 21/83; G06F 3/016; G06F 3/041; G06F 3/0418; G06F 3/044; H03K 17/962; H03K 2217/9607; H03K 2217/960705; H03K 2217/960755
See application file for complete search history.

(56) References Cited

U.S. PATENT DOCUMENTS

| 6,108,141 A * | 8/2000 | Gadberry ................ B60R 1/005 296/97.2 |
| 9,698,777 B1 * | 7/2017 | Alon ...................... H03K 17/98 |
| 2016/0204644 A1 * | 7/2016 | Dukerschein ......... H02J 7/0047 320/108 |
| 2017/0285804 A1 * | 10/2017 | Li .......................... G06F 3/044 |

* cited by examiner

*Primary Examiner* — Carlos E Garcia
(74) *Attorney, Agent, or Firm* — ScienBiziP, P.C.

(57) ABSTRACT

A remote control device with assured button functionality includes a case, at least one key located on the case, and at least one key circuit located under the at least one key. Each of the at least one keys corresponds to a compensation capacitance, which also connects to at least one key circuit. A capacitance is generated when a user presses the touch panel and the at least one key circuit is thereby unbalanced, to trigger the remote to generate command signal when the at least one key circuit is electrically connected to the at least one compensation capacitance through the capacitance.

10 Claims, 3 Drawing Sheets

REMOTE CONTROL DEVICE

CROSS-REFERENCE TO RELATED APPLICATIONS

This application claims priority to Chinese Patent Application No. 201710851033.0 filed on Sep. 20, 2017, the contents of which are incorporated by reference herein.

FIELD

The subject matter herein generally relates to control technology, and particularly to a remote control device.

BACKGROUND

Keys of a remote control device may lose function or function intermittently after a period of time. Therefore, a new type of remote control device is needed.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
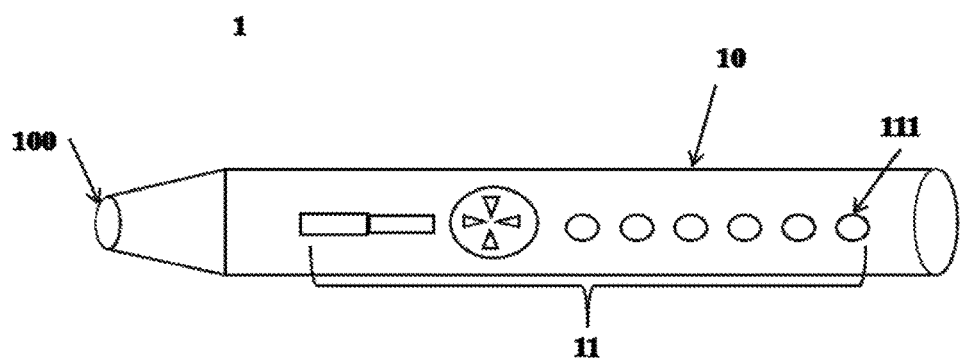
FIG. 1 is a schematic diagram of one exemplary embodiment of a remote control device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

It should be noted that references to "a/an" or "one" embodiment in this disclosure are not necessarily to the same embodiment, and such references mean "at least one." Furthermore, the term "comprising" means "including, but not necessarily limited to"; it specifically indicates open-ended inclusion or membership in a so-described combination, group, series and the like. The term "coupled" is defined as connected, whether directly or indirectly through intervening components, and is not necessarily limited to physical connections. The connection can be such that the objects are permanently connected or releasable connected.

Exemplary embodiments of the present disclosure will be described in relation to the accompanying drawings.

Figure 2:
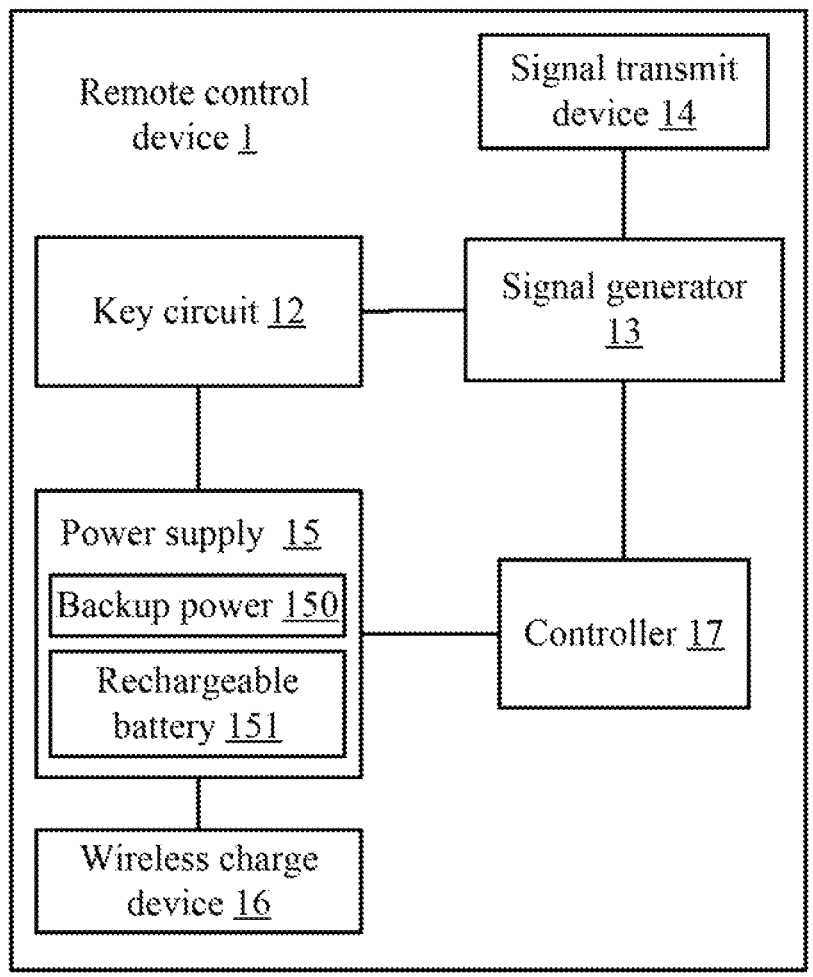
FIG. 2 is a structure schematic of one exemplary embodiment of the device of FIG. 1.

FIG. 1 and FIG. 2 illustrate an exemplary embodiment of a remote control device 1. Depending on the embodiment, the remote control device 1 can include, but is not limited to, a case 10, at least one key 11, at least one key circuit 12, a signal generator 13, a signal transmit device 14, a power supply 15, a wireless charge device 16, and a controller 17. The at least one key 11 is located at the case 10, and the at least one key circuit 12, the signal generator 13, the signal transmit device 14, the power supply 15, the wireless charge device 16, and the controller 17 are set inside the case 10. FIG. 1 illustrates only one example of the remote control device 1 that can include more or fewer components than illustrated, or have a different configuration of the various components in other embodiments.

In at least one exemplary embodiment, the case 10 can be of a cylinder shape. The cylinder shape of the case 10 can reduce the size of the remote control device 1 and can improve feel in the hand of the user. A Fresnel lens is located at a front end of the case 10. The Fresnel lens can combine signals generated by the signal generator 13, and avoid dimming of the signal as a result of divergence.

In at least one exemplary embodiment, the at least one key 11 can include, but is not limited to, an on-off key, volume keys, function keys, channel switch keys, number keys, and TV program schedule key. One portion of the at least one key 11 is located at one side of the case 10, and the other portion of the at least one key 11 is located at the other side of the case 10. For example, the on/off key, the volume keys, the number keys, and the channel switch keys are located at the front of the case 10, and the function keys and the TV program schedule key are located at the back of the case 10.

In at least one exemplary embodiment, each of the at least one key 11 can include a touch panel 111. The touch panel 111 can accept a press operation of a user.

Figure 3:
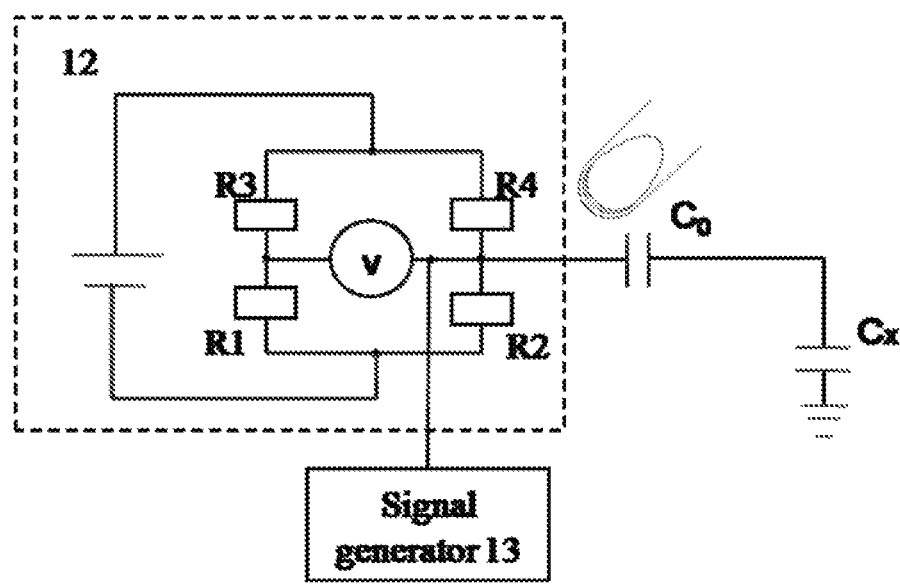
FIG. 3 is a schematic diagram of one exemplary embodiment of a key circuit of the device of FIG. 1.

In at least one exemplary embodiment, each of the at least one key 11 corresponds to a key circuit 12, and the key circuit 12 located under the at least one key 11. Refer to FIG. 3, The key circuit 12 can include a Wheatstone bridge circuit. The Wheatstone bridge circuit can include four resistances R0, R1, R2, and R3. The four resistances connect to one another forming a quadrilateral. Four sides of the quadrilateral are the four arms of the Wheatstone bridge circuit. One diagonal of the quadrilateral connects to a voltmeter, and the other diagonal of the quadrilateral connects to the power supply 15. The voltmeter connects to the touch panel 111 of the key 11.

In at least one exemplary embodiment, each one of the at least one keys 11 corresponds to a compensation capacitance $C_x$, and the compensation capacitance $C_x$ connects to the touch panel 111. The touch panel 111 may generate a capacitance $C_0$ when the user presses the touch panel 111. Then, the Wheatstone bridge circuit can electrically connect to one end of the compensation capacitance $C_x$ through the capacitance $C_0$, and the other end of the compensation capacitance $C_x$ is grounded.

In at least one exemplary embodiment, the voltmeter also connects to the signal generator 13. Until the user presses the touch panel 111 of the key 11, the key circuit 12 does not connect to the capacitance $C_0$ and the compensation capacitance $C_x$ electrically. The Wheatstone bridge circuit is in balance, and cannot trigger the signal generator 13 to generate signal. When the user presses the touch panel 111 of the key 11, the key circuit 12 connects to the capacitance $C_0$ and the compensation capacitance $C_x$ electrically. The Wheatstone bridge circuit is then not in balance, and can trigger the signal generator 13 to generate signal.

In at least one exemplary embodiment, the value of the compensation capacitance $C_x$ which corresponds to each of the at least one key 11, is relevant to the position of the at least one key 11 on the case 10. That is, the at least one key 11 is located on different positions of the case 10, and the values of the compensation capacitances $C_x$ are different too. When the user presses the at least one key 11 in different positions, the key circuit 12 can trigger the signal generator 13 to generate different signals as the key circuit 12 can connect to the compensation capacitance $C_x$ with different values. Then, the remote control device 1 can send different signals to a television or other receiver.

In at least one exemplary embodiment, the signal transmit device 14 connects to the signal generator 13. When the signal generator 13 is triggered to generate the signal, the signal generator 13 will send the signal to the signal transmit device 14, and the signal transmit device 14 will transmit the signal to the television.

In at least one exemplary embodiment, the power supply 15 can include a backup power 150 and a rechargeable battery 151. For example, the backup power 150 can be an ordinary dry battery or an alkaline battery, and the rechargeable battery 151 can be a lithium battery. The wireless charge device 16 can charge the rechargeable battery 151.

In at least one exemplary embodiment, the controller 17 can be a central processing unit (CPU), a microprocessor, or other data processor chip. The controller 17 can control the backup power 150 and the rechargeable battery 151 to supply power to the remote control device 1 when the user presses the at least one key 11 of the remote control device 1. For example, the controller 17 can control the backup power 150 to supply power to the remote control device 1 when the user presses the on/off key. The controller 17 can control the rechargeable battery 151 to supply power to the remote control device 1 when the user presses the function keys or the channel switch keys.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A remote control device comprising:
a case;
at least one key located on the case and each of the at least one key comprising a touch panel;
at least one key circuit located under the at least one key; and
at least one compensation capacitance;
wherein each of the at least one key corresponds to one of the at least one compensation capacitance;
each of the at least one key circuit is connected to one of the at least one compensation capacitance through the touch panel, the touch panel generates a capacitance when a user presses the touch panel; and
each of the at least one key circuit triggers the remote control device to generate a signal when each of the at least one key circuit is electrically connected to one of the at least one compensation capacitance through the capacitance, wherein each of the at least one key circuit comprises a Wheatstone bridge circuit.

2. The remote control device according to claim 1, further comprising a Fresnel lens located on a front end of the case, wherein the Fresnel lens is configured to combine the generated signal.

3. The remote control device according to claim 1, wherein a value of the at least one compensation capacitance which corresponds to each of at least one key, is relevant to a position of the at least one key located on the case.

4. The remote control device according to claim 1, further comprising a power supply, wherein the power supply comprises a backup power and a rechargeable battery.

5. The remote control device according to claim 4, further comprising a wireless charge device, wherein the wireless charge device charges the rechargeable battery.

6. The remote control device according to claim 5, further comprising a controller, wherein the controller controls the backup power or the rechargeable battery to supply power to the remote control device when the user presses the at least one key.

7. The remote control device according to claim 1, further comprising a signal generator electrically connects to the at least one key circuit, wherein the signal generator is configured to generate signal.

8. The remote control device according to claim 7, further comprising a signal transmit device electrically connects to the signal generator, wherein when the signal generator is triggered to generate the signal, the signal generator sends the signal to the signal transmit device, and the signal transmit device transmits the signal to a receiver.

9. The remote control device according to claim 1, wherein the case is of a cylinder shape.

10. The remote control device according to claim 1, wherein one portion of the at least one key located at one side of the case, and the other portion of the at least one key located at the other side of the case.

* * * * *